United States Patent [19]

Gutierrez et al.

[11] Patent Number: 5,388,226
[45] Date of Patent: Feb. 7, 1995

[54] METHOD AND APPARATUS FOR ACCESSING A REGISTER IN A DATA PROCESSING SYSTEM

[75] Inventors: Joseph A. Gutierrez, Austin; William C. Moyer, Dripping Springs; Yui K. Ho; Pee-Keong Or, both of Austin, all of Tex.

[73] Assignee: Motorola, Inc., Schaumburg, Ill.

[21] Appl. No.: 956,194

[22] Filed: Oct. 5, 1992

[51] Int. Cl.⁶ ............................................. G06F 12/02
[52] U.S. Cl. .................................. 395/325; 364/247; 364/260; 364/260.2; 364/232.9; 364/243.41; 364/DIG. 1
[58] Field of Search ............... 395/325, 425, 275, 800, 395/250; 365/221

[56] References Cited

U.S. PATENT DOCUMENTS

| | | | |
|---|---|---|---|
| 4,130,868 | 12/1978 | Heuer et al. | 395/425 |
| 4,272,829 | 6/1981 | Schmidt et al. | 395/800 |
| 4,439,829 | 3/1984 | Tsiang | 395/425 |
| 4,755,936 | 7/1988 | Stewart et al. | 395/425 |
| 5,115,506 | 5/1992 | Cohen | 395/725 |
| 5,123,097 | 6/1992 | Joyce et al. | 395/375 |
| 5,140,681 | 8/1992 | Uchiyama et al. | 395/425 |
| 5,148,536 | 9/1992 | Witek et al. | 395/425 |
| 5,201,041 | 4/1993 | Bohner et al. | 395/425 |
| 5,202,969 | 4/1993 | Sato et al. | 395/425 |
| 5,249,284 | 9/1993 | Kass et al. | 395/425 |

Primary Examiner—Gopal C. Ray
Attorney, Agent, or Firm—Susan C. Hill

[57] ABSTRACT

A method and apparatus for accessing a register in a data processing system (10). In one form, the present invention uses a storage circuit (23) to act as a register copy (23) of the original register (33). An access to the register location may actually selectively access the original register (33), the register copy (23), or both the original register (33) and the register copy (23). Register select logic (70) is used to perform this selection function. Register select logic (70) may also be used to keep track of the current status of the contents of the original register (33) and of the contents of the register copy (23). Register select logic (70) may also monitor the internal state of data processing system (10).

20 Claims, 5 Drawing Sheets

METHOD AND APPARATUS FOR ACCESSING A REGISTER IN A DATA PROCESSING SYSTEM

FIELD OF THE INVENTION

The present invention relates in general to a data processing system, and more particularly to a method and apparatus for accessing a register in a data processing system.

BACKGROUND OF THE INVENTION

Today's data processing systems often require the transfer of large volumes of information in as short a time as possible. When the data processing system is incorporated onto one or a few integrated circuits, the requirement of minimal semiconductor area is usually added.

Most microprocessors use one or more busses to transfer information, such as data, address, and control, from various portions of the integrated circuit. A problem arises when two or more registers are to be read or written concurrently and there is only one available bus to access both registers. A variety of possible solutions to this problem have been used in the past. For example, one solution is merely to add an additional bus or extend an existing bus so that both registers can be written concurrently using two different busses. The drawback to this solution is that it may require a prohibitive amount of semiconductor area, especially as the size of microprocessor chips increases and busses must be routed long distances.

Another possible solution is to use the existing bus structure to first write one register and then the other register. Although this solution does not require more semiconductor area, it does require more time. In addition, the fact that the two registers are no longer accessed concurrently creates a coherency problem between the data in the first register and the data in the second register. In order to maintain coherency in the data being transferred to or from the two registers, the existing bus to the two registers may have to be locked in order to prevent intervening accesses to the two registers. Alternatively, a status bit could be used in order to indicate whether or not coherency had been maintained.

SUMMARY OF THE INVENTION

The previously mentioned needs are fulfilled and other advantages achieved with the present invention. In one form, the present invention is a method and apparatus for accessing a register in a data processing system. In one embodiment, the present invention is a data processing system having a register and a storage circuit. The data processing system also has select logic which is coupled to the register and to the storage circuit. The select logic generates a first select signal and a second select signal.

The data processing system also has a source circuit which is coupled to the register and to the storage circuit. When a write access is made to the register, if the first select signal is asserted, then the source circuit transfers a value into the register; if the second select signal is asserted, then the source circuit transfers the value into the storage circuit; and if both the first and second select signals are asserted, then the source circuit transfers the value into both the storage circuit and the register.

The present invention will be understood by one skilled in the art from the detailed description below in conjunction with the accompanying drawings.

DESCRIPTION OF THE PREFERRED EMBODIMENTS

A more time efficient and semiconductor area efficient solution was needed to the problem of concurrent accesses to multiple registers. If there are fewer busses available than the number of registers which must be accessed across those busses, one possible solution is to use an available and accessible storage circuit as a copy of the register. Instead of routing an extra bus or creating coherency problems, the register copy can be accessed when a bus is not available, and the original register can be accessed when the bus is available. Register select logic can be used to keep track of the present status of both the original register and the register copy. The register select logic can also be used to determine whether or not to transfer data to or from the original register, as well as whether or not to transfer data to or from the register copy.

The register select logic also gives the hardware designer a great deal of flexibility. An integrated circuit designer can use the present invention to keep one or more copies of a register value available. The integrated circuit designer can select whether a write access to a register will transfer a value into the original register, into the register copy, or into both the original register and the register copy. Likewise, the integrated circuit designer can select whether a read access to a register will transfer a value from the original register, from the register copy, or from both the original register and the register copy. In addition, the integrated circuit designer can now select which bus or busses will be used for a read access to the register and which bus or busses will be used for a write access to the register.

The present invention can be made transparent to the software programs which run on the data processing system. As a result, a user of the data processing system need not keep track of whether the original register or the register copy is the target of the present access. In fact, the user of the data processing system may access the register in the register map in the same manner regardless of whether or not the invention is being used. Thus the invention allows the integrated circuit designer to save time and semiconductor area without increasing the programming complexity for a user of the data processing system.

DESCRIPTION OF THE FIGURES

The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Figure 1:
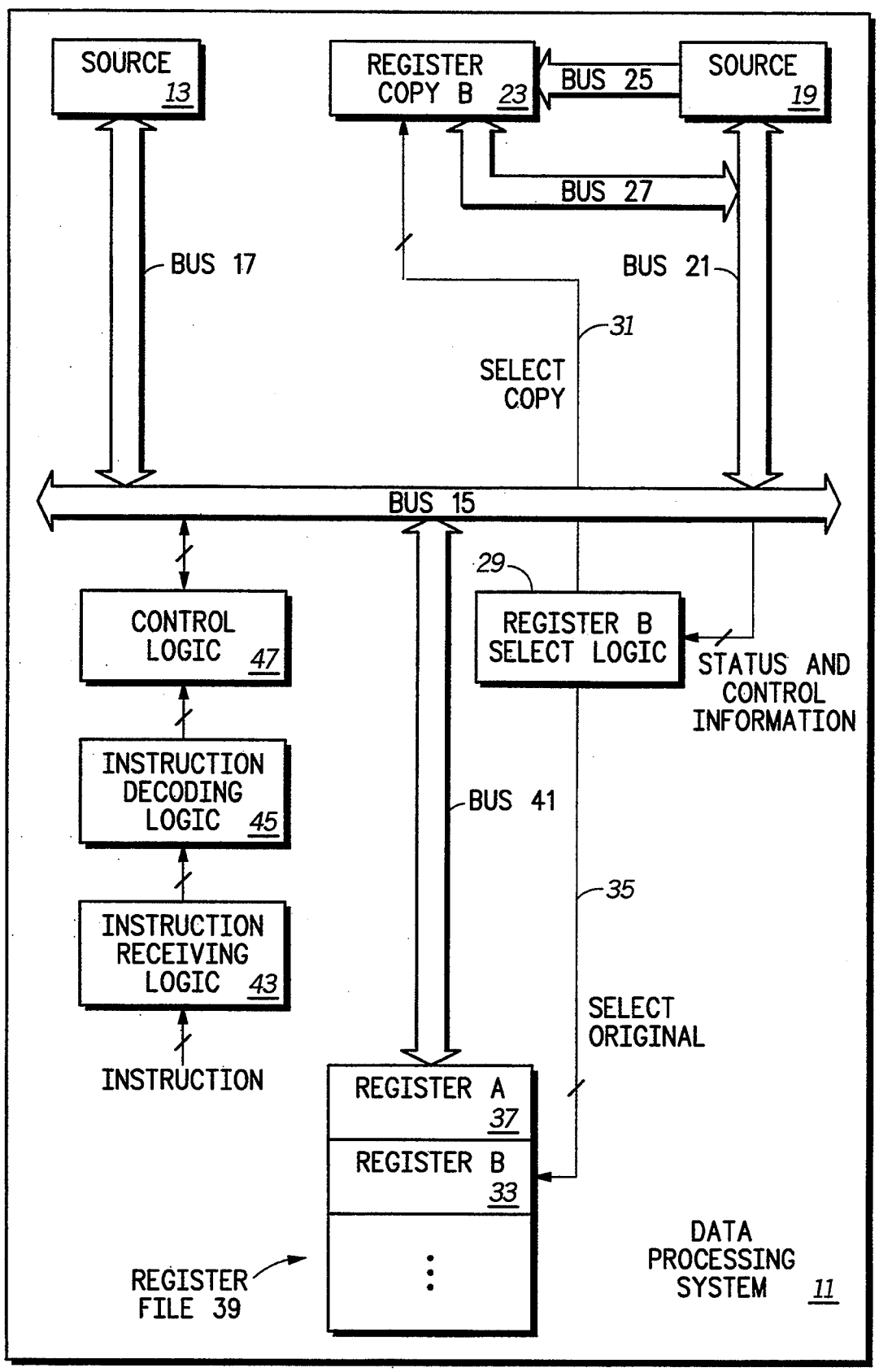
FIG. 1 illustrates, in block diagram form, a data processing system 11 in accordance with one embodiment of the present invention.

FIG. 1 illustrates a data processing system 11. Source 13 is bi-directionally coupled to bus 15 by way of bus 17. Source 19 is bi-directionally coupled to bus 15 by way of bus 21. Source 19 is coupled to register copy B 23 by way of bus 25. Register copy B 23 is bi-directionally coupled to bus 21 by way of bus 27. Register B select logic 29 receives status and control information from bus 15. Register B select logic 29 is coupled to register copy B 23 by way of one or more select signals 31. Register B select logic 29 is coupled to register B 33 by way of one or more select signals 35. Register A 37 and register B 33 are both part of a register file 39. Register file 39 is bi-directionally coupled to bus 15 by way of bus 41.

Instruction receiving logic 43 receives instructions from an instruction source (not shown) which is either part of data processing system 11 or is external to data processing system 11. Instruction receiving logic 43 is coupled to instruction decode logic 45. Instruction decode logic 45 is used to decode the received instructions. Instruction decode logic 45 is coupled to control logic 47. Control logic 47 is bi-directionally coupled to bus 15. Control logic 47 transmits control information throughout data processing system 11 in order to execute the received instructions.

Figure 2:
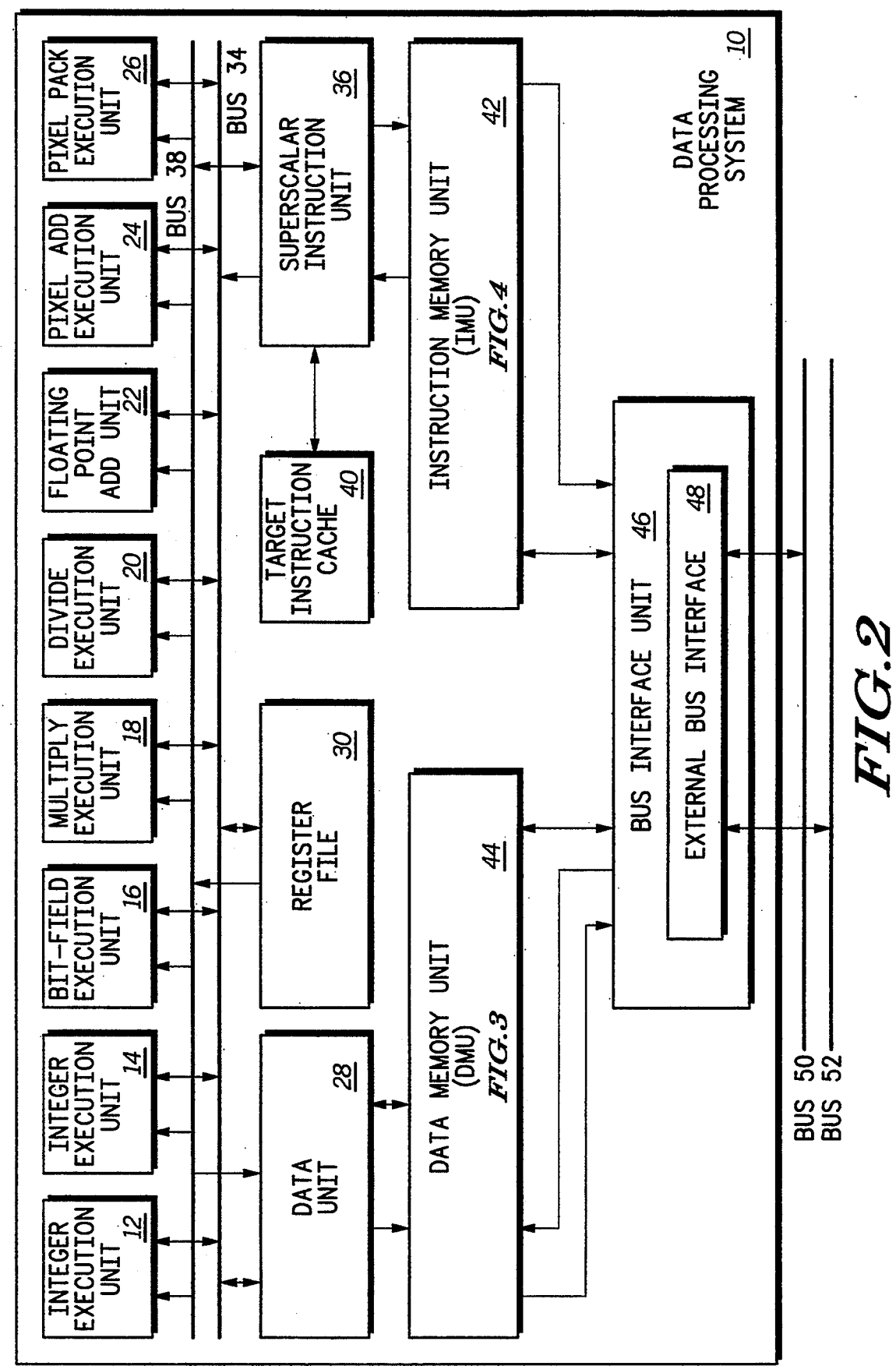
FIG. 2 illustrates, in block diagram form, a data processing system 10 in accordance with one embodiment of the present invention.

FIG. 2 illustrates a data processing system 10. Integer execution unit 12, integer execution unit 14, bit-field execution unit 16, multiply execution unit 18, divide execution unit 20, floating point add unit 22, pixel add execution unit 24, pixel pack execution unit 26, data unit 28, and register file 30 are all bi-directionally coupled to bus 34. In addition, superscalar instruction unit 36 is coupled to bus 34 in order to provide signals to bus 34.

Integer execution unit 12, integer execution unit 14, bit-field execution unit 16, multiply execution unit 18, divide execution unit 20, floating point add unit 22, pixel add execution unit 24, and pixel pack execution unit 26, and data unit 28 are all coupled to bus 38 in order to receive signals from bus 38. In addition, superscalar instruction unit 36 is bi-directionally coupled to bus 38. Register file 30 is coupled to bus 38 in order to provide signals to bus 38.

Target instruction cache 40 and instruction memory unit (IMU) 42 are each bi-directionally coupled to superscalar instruction unit 36. Data memory unit (DMU) 44 is bi-directionally coupled to data unit 28.

Instruction memory unit (IMU) 42 and data memory unit (DMU) 44 are each bi-directionally coupled to bus interface unit 46. Bus interface unit 46 has an external bus interface 48 which is bi-directionally coupled to bus 50 and to bus 52. In one embodiment of the present invention illustrated in FIG. 2, all of data processing system 10 is located on one integrated circuit, and bus 50 and bus 52 are both external to data processing system 10.

Figure 3:
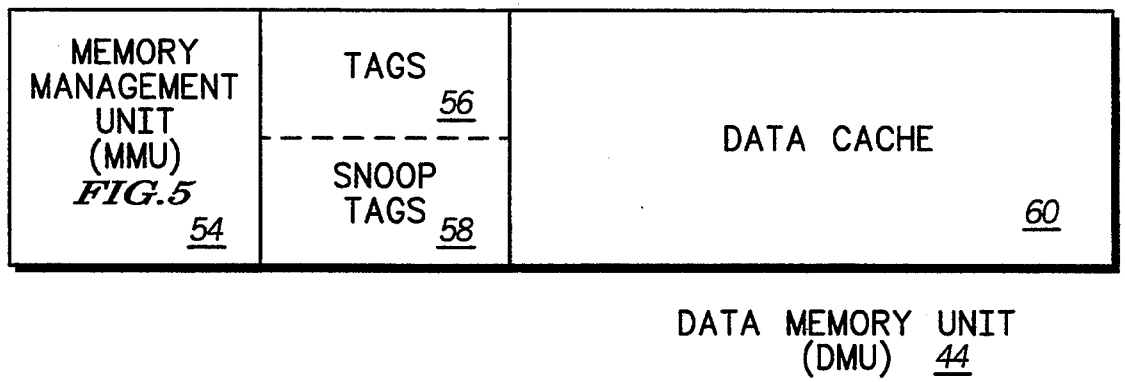
FIG. 3 illustrates, in block diagram form, a data memory unit 44 of FIG. 2 in accordance with one embodiment of the present invention.

FIG. 3 illustrates a data memory unit (DMU) circuit 44 of FIG. 2. DMU 44 includes a memory management unit (MMU) circuit 54, a tags circuit 56, a snoop tags circuit 58, and a data cache circuit 60.

Figure 4:
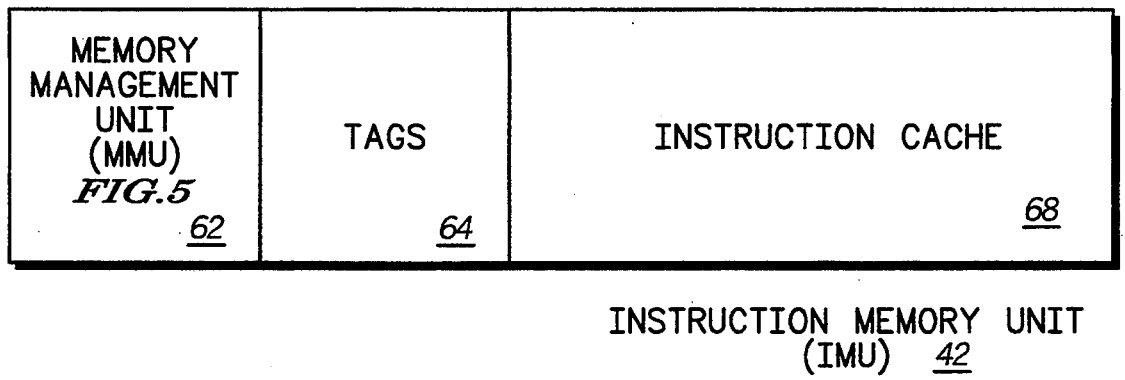
FIG. 4 illustrates, in block diagram form, an instruction memory unit 42 of FIG. 2 in accordance with one embodiment of the present invention.

FIG. 4 illustrates an instruction memory unit (IMU) circuit 42 of FIG. 2. IMU 42 includes a memory management unit (MMU) circuit 62, a tags circuit 64, and an instruction cache circuit 68.

Figure 5:
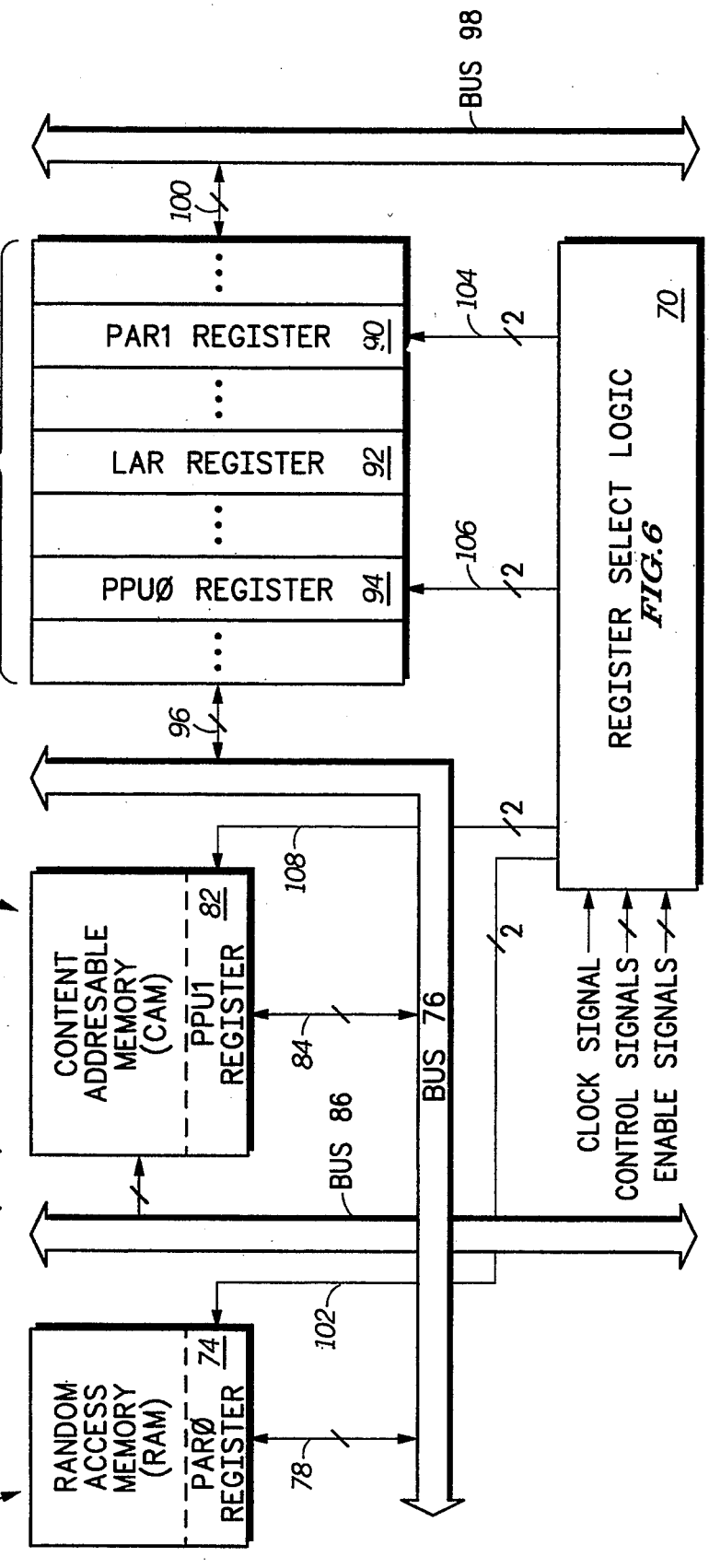
FIG. 5 illustrates, in block diagram form, a portion of memory management unit (MMU) 54 of FIG. 3, which is identical to a portion of memory management unit (MMU) 62 of FIG. 4, in accordance with one embodiment of the present invention.

FIG. 5 illustrates a portion of memory management unit (MMU) 54 of FIG. 3. Note that in one embodiment of the present invention, the portion of MMU 54 which is illustrated in FIG. 5 is identical to a portion of memory management unit (MMU) 62 of FIG. 4. In other embodiments of the present invention, FIG. 5 may illustrate a portion of only one memory management unit, or an identical portion of more than one memory management unit.

Still referring to FIG. 5, a register select logic circuit 70 receives a clock signal, control signals, and enable signals. Register select logic 70 then uses these input signals along with existing state information which register select logic circuit 70 has stored internally in order to determine which select output or outputs to assert and which select output or outputs to negate. Note that each select output must either be asserted or negated.

Random access memory (RAM) 72 has a PAR0 register 74. "PAR0" is the register name which stands for "access physical address, copy 0". RAM 72 is bi-directionally coupled to bus 76 by way of bus 78. Content addressable memory (CAM) 80 has a PPU1 register 82. "PPU1" is the register name which stands for "page address translation cache R/W port (upper), copy 1". CAM 80 is bi-directionally coupled to bus 76 by way of bus 84. CAM 80 is also coupled to bus 86.

Control register file 88 has a PAR1 register 90, a LAR register 92, and a PPU0 register 94. Some embodiments of control register file 88 may also contain additional registers (not shown). "PAR1" is the register name which stands for "access physical address, copy 1". "LAR" is the register name which stands for "access logical address". "PPU0" is the register name which stands for "page address translation cache R/W port (upper), copy 0". Control register file 88 is bi-directionally coupled to bus 76 by way of bus 96. In addition, control register file 88 is bi-directionally coupled to bus 98 by way of bus 100.

Register select logic 70 is coupled to PAR0 register 74 by way of select signals 102. Register select logic 70 is coupled to PAR1 register 90 by way of select signals 104. Register select logic 70 is coupled to PPU0 register 94 by way of select signals 106. And register select logic 70 is coupled to PPU1 register 82 by way of select signals 108.

Figure 6:
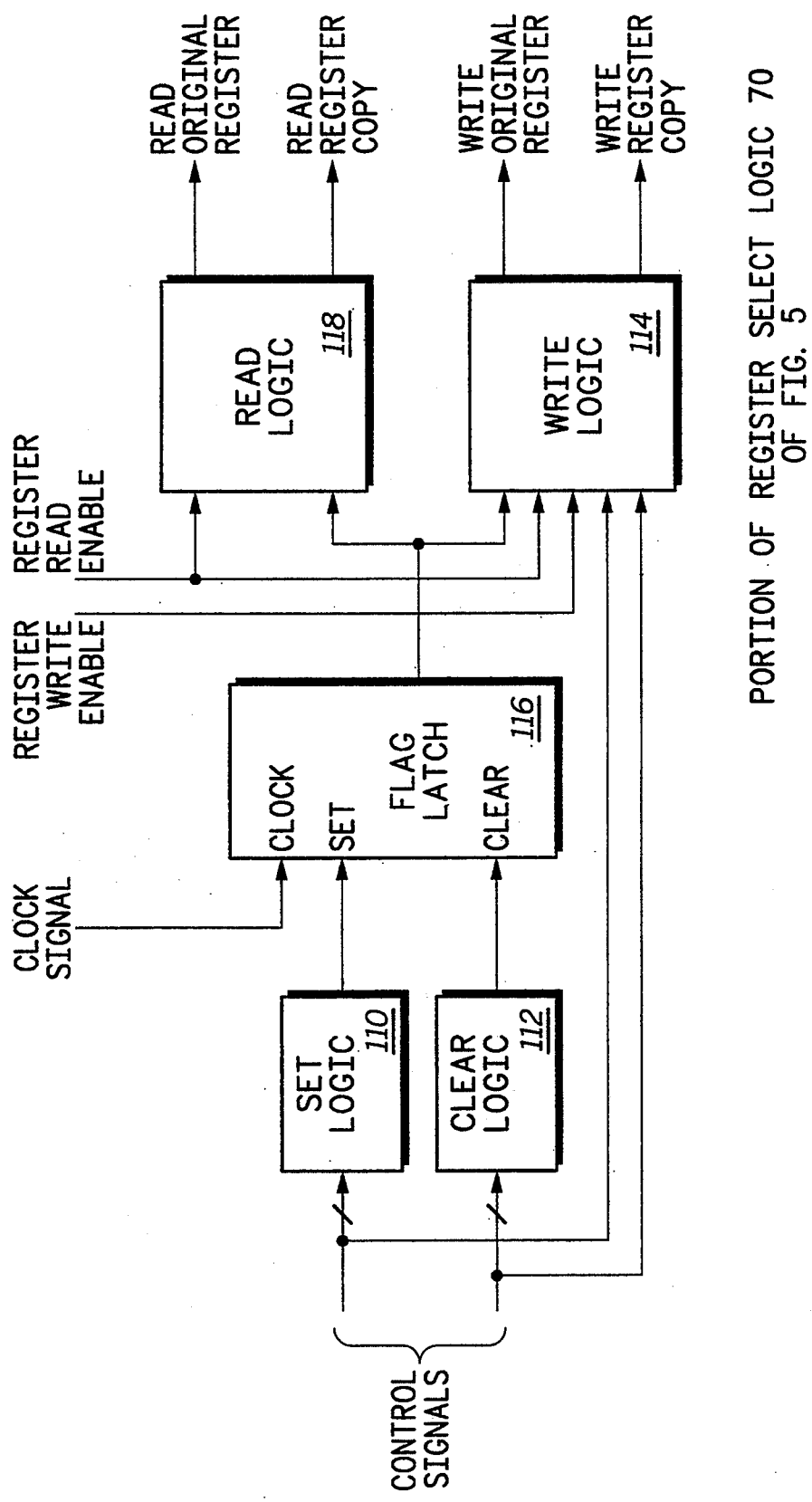
FIG. 6 illustrates, in block diagram form, a portion of register select logic 70 of FIG. 5 in accordance with one embodiment of the present invention.

FIG. 6 illustrates one embodiment of a portion of the register select logic 70 of FIG. 5. Set logic circuit 110, clear logic circuit 112, and write logic circuit 114 each receive control signals as inputs. The output of set logic 110 is the set input of flag latch circuit 116. The output of clear logic 112 is the clear input of flag latch 116. Note that the output of set logic 110 and the output of clear logic 112 are not intended to be asserted at the same time in the illustrated embodiment. Flag latch 116 receives a clock signal as the clock input.

The output of flag latch 116 is coupled to read logic 118 and to write logic 114. Both read logic 118 and write logic 114 receive a register read enable signal as an input. Only write logic 114 receives a register write enable signal as an input. Read logic 118 outputs a read original register signal and a read register copy signal. Write logic 114 outputs a write original register signal and a write register copy signal.

OPERATION OF THE PREFERRED EMBODIMENT

Referring to FIG. 1, data processing system 11 has an original register B 33 and an original register A 37 which both reside in register file 39. In the simplest case, register file 39 has only one bus 41 which can transfer information into or out of only one register in register file 39 at a time. A problem thus arises when more than one register in register file 39 must be accessed at a time.

As an example, if one data value has too many binary bits to store in just one register two, registers may be required to store the data value. But coherency must be maintained between the two portions of the data value. If two separate write accesses across bus 41 are required in order to store the data value into register A 37 and register B 33, coherency is lost during the time between the two write accesses.

For example, if a fault condition occurs in data processing system 11 after the first write access to register A 37 has been completed, the second write access to register B 33 may be delayed until data processing system 11 has handled and resolved the fault condition. The software program which handles the fault condition may need to use the data value in order to correct the fault and return to normal processing. But the data value has been corrupted. The first portion of the data value in register A 37 does not belong with the second portion of the data stored in register B 33. The portion of the data value in register A 37 has been updated, whereas the portion of data value in register B 33 has not.

One possible example of such a data value is a logical address and a physical address from an address translation cache. Both the most recently used logical address and its corresponding physical address may be required in order to continue processing if certain fault conditions occur in data processing system 11. Matching a logical address with an incorrect physical address is a serious problem for data processing system 11.

The following terms will be used throughout the remainder of this portion of the specification. "Register location" will be used to refer to the user's abstract view of a single storage location in the register map of data processing system 11. Referring to FIG. 1, the user is only aware of one register location B. "Original register" will be used to refer to the one physical storage circuit which existed in data processing system 11 before the addition of the present invention. "Register copy" will be used to refer to the physical storage circuit which has been incorporated into data processing system 11 in order to implement the present invention. Note that some embodiments of the present invention may have multiple register copies.

Continuing with the example using FIG. 1, assume for illustrative purposes that the first portion of the data value is initially located in source 13 and the second portion of the data value is initially located in source 19. Data processing system 11 needs a way to allow a write from source 13 to register location A and from source 19 to register location B so that coherency is maintained. But, bus 41 will only allow one register in register file 39 to be written at a time. The present invention solves this problem by utilizing a register copy B 23 as a register copy, and by utilizing register B select logic 29 to select between register B 33 and register copy B 23.

So now when data processing system 11 attempts to write from source 13 to register location A and from source 19 to register location B while maintaining coherency, register B select logic 29 detects that register copy B 23 should be accessed rather than register B 33. Thus coherency is maintained because source 13 writes the first portion of the data value into register A 37 across busses 17, 15, and 41; while concurrently source 19 writes the second portion of the data value into register copy B 23 across bus 25. If a fault condition then occurs in data processing system 11, register B select logic 29 can be used to determine that register copy B 23 should be accessed along with register A 37 in order to retrieve the entire data value.

Register B select logic 29 can store information regarding the existing status of the contents of both register B 33 and register copy B 23. In addition, register B select logic 29 can receive status and control information from bus 15 regarding any new operations to be performed which involve one or more accesses to register location B. Using the information regarding the existing status and the new operation to be performed, register B select logic 29 can determine whether the next access to register location B should actually access register B 33 or register copy B 23. Register B select logic 29 then asserts the appropriate select signals in order to allow the correct register or registers to be accessed.

In the embodiment of the present invention illustrated in FIG. 1, there is a separate select signal for read accesses and a separate select signal for write accesses. Other embodiments of the present invention may use just one select signal to indicate that the register is being accessed, and other logic (not shown) may be used to indicate to the register whether the access is a read access or a write access.

Some software instruction may require an access to register location B. Instruction receiving logic 43 receives software instructions from either internal or external to data processing system 11. Instruction decode logic 45 is used to decode the received instructions. Control logic 47 transmits control information throughout data processing system 11 in order to execute the received instructions. In addition, some internal data processing system operations which are not initiated by a software instruction may require an access to register location B. For example, the internal hardware processing which results when an interrupt or a fault condition occurs may require an access to register location B even before any further software instructions are received and decoded.

Note that register B select logic 29 can assert its select signals so that only one register is selected, or can alternatively assert its select signals so that multiple registers are selected. Thus register B 33 and register copy B 23 can both be written and updated simultaneously if there are busses available to perform the write operations. Likewise, register B 33 and register copy B 23 can both be read simultaneously if there are busses available to perform the read operations.

The present invention may be particularly useful when source 19 is located remotely from register file 39. If source 19 is located remotely from register file 39, there may be several busses that must be used in order to transfer information between source 19 and register file 39. The more busses that are required to transfer information between source 19 and register file 39, the greater the chance that there will be a conflict with another source that is also attempting to access register file 39. Usually there is a correlation between proximity of a source and a destination and the number of busses which must be used to transfer information between them. Thus in most embodiments of the present invention, the various registers which form register file 39 are usually located in close proximity to each other relative to the proximity of register copy B 23. However, this is not always the case.

In some embodiments of the present invention, register copy B 23 is also used for another function unrelated to register B. When register copy B 23 is needed by register B select logic 29, it is used to store data intended for register location B. But when register copy B is not needed, it may be used as a storage circuit for other purposes unrelated to register location B. Register B select logic 29 keeps track of when register copy B 23 is being used to store data intended for register location B, and when register copy B 23 is available to be used as a storage circuit for other purposes unrelated to register location B.

FIG. 2 illustrates a data processing system 10 illustrating an alternate embodiment of the present invention. FIG. 3 illustrates one possible implementation of data memory unit 44 of FIG. 2. FIG. 4 illustrates one possible implementation of instruction memory unit 42 of FIG. 2. FIG. 5 illustrates one embodiment of a portion of memory management unit (MMU) 54 of FIG. 3, which is identical to one embodiment of a portion of memory management unit (MMU) 62 of FIG. 4.

FIG. 5 illustrates two register locations, namely the register location PPU and the register location PAR, which each have one original register and one register copy. The original register PPU, labeled PPU0 register 94, is located in control register file 88. The original register PAR, labeled PAR1 register 90, is also located in control register file 88. The register copy PPU, labeled PPU1 register 82, is located in CAM 80. The register copy PAR, labeled PAR0 register 74, is located in RAM 72.

Note that when PPU1 register 82 is needed by register select logic 70, it is used to store data intended for register location PPU. But when PPU1 register 82 is not needed, it may be used as a storage circuit in CAM 80 for other purposes unrelated to register location PPU. Note that when PAR0 register 74 is needed by register select logic 70, it is used to store data intended for register location PAR. But when PAR0 register 74 is not needed, it may be used as a storage circuit in RAM 72 for other purposes unrelated to register location PAR.

Register select logic 70 performs the same selecting function as register B select logic 29 in FIG. 1, with the difference that register select logic 70 performs a selecting function for two rather than one register location. Alternate embodiments of the present invention may use register select logic 70 to perform a selecting function for as many register locations as desired.

FIG. 6 illustrates a portion of the register select logic 70 of FIG. 5 in accordance with one embodiment of the present invention. The circuitry illustrated in FIG. 6 can be used to generate the select signals for one register location which utilizes one original register and one register copy. The logic illustrated in FIG. 6 may be duplicated in order to generate the select signals for two register locations as required by the register select logic 70 illustrated in FIG. 5. In addition, read logic 118 and write logic 114 can be modified so as to generate more select signals if there is more than one register copy for each register location.

Referring to FIG. 5 and FIG. 6, the control signals received by register select logic 70 are used to input information about the internal state of data processing system 10. The control signals contain state information which is relevant for accesses to the register location. Some of the same control signals may be input to both set logic 110 and clear logic 112. Generally there will also be some control signals which are input to only one of set logic 110 and clear logic 112. In the embodiment of the present invention illustrated in FIG. 6, the control signals are also input to write logic 114. This is because write logic 114 needs to store state information in order to make its determination as to whether to select the original register, the register copy, or both the original register and the register copy.

In alternate embodiments of the present invention, the control signals may also be input to read logic 118. Thus read logic 118 may store state information in order to make its determination as to whether to select the original register, the register copy, or both the original register and the register copy. In the embodiment of the present invention illustrated in FIG. 6, only the output of flag latch 116 is needed by read logic 118 in order to make its determination as to whether to select the original register or the register copy. In alternate embodiments of the present invention, read logic 118 may, like write logic 114, have the ability to select both the original register and the register copy concurrently. However in data processing system 10, this functionality was not needed.

In FIG. 6, the read original register signal is a select signal which is used to select the original register for read accesses. The read register copy signal is a select signal which is used to select the register copy for read accesses. The write original register signal is a select signal which is used to select the original register for write accesses. And the write register copy signal is a select signal which is used to select the register copy for write accesses.

Flag latch 116 is used to store past state information. Flag latch 116 is updated whenever a relevant change occurs in the state of data processing system 10. By selecting which control signals are used as inputs to register select logic 70, an integrated circuit designer can determine which states will affect flag latch 116 and write logic 114. Thus the integrated circuit designer has a great deal of flexibility in determining exactly which register or registers to select for each particular read access to a register location, and which register or registers to select for a particular write access to the same register location.

The register write enable signal and the register read enable signal which are illustrated in FIG. 6 may be considered as particular control signals which are illustrated individually. Read logic 118 uses the register read enable signal to determine that a read access is being requested to the register location served by the portion of register select logic 70 illustrated in FIG. 6. Write logic 114 uses the register write enable signal to determine that a write access is being requested to the register location served by the portion of register select logic 70 illustrated in FIG. 6.

In the illustrated embodiment of the present invention, write logic 114 also receives the register read enable signal. Using the read enable signal and the output of flag latch 116, the write enable logic is able to keep of track of whether read logic 118 is selecting the original register or the register copy. In alternate embodiments of the present invention, read logic 118 may additionally receive information, such as the write original register signal and the write register copy signal, in order to keep track of whether write logic 114 is selecting the original register, the register copy, or both.

In alternate embodiments of the present invention, the read logic 118 and the write logic 114 may be combined to form one block of logic which supplies all select signals for all type of accesses to the register location. In other alternate embodiments of the present invention, the functionality of set logic 110, clear logic 112, flag latch 116, read logic 118, and write logic 114 can be divided into different logic blocks which receive control signals as inputs and use these control inputs, along with stored state information, to determine which output select signals to assert and which output select signals to negate.

SUMMARY AND SOME ALTERNATE EMBODIMENTS

In summation, the above specification describes a more time efficient and semiconductor area efficient solution to the problem of concurrent accesses to multiple registers in a data processing system 10 and in a data processing system 11. In one form, the present invention uses a storage circuit 23 to act as a register copy 23 of the original register 33. An access to the register location may actually selectively access the original register 33, the register copy 23, or both the original register 33 and the register copy 23. Register select logic 70 can be used to perform this selection function. Register select logic 70 can also be used to keep track of the present status of both the original register and the register copy. Register select logic 70 may also monitor the internal state of data processing system 10.

Register select logic 70 also gives the hardware designer a great deal of flexibility. An integrated circuit designer can use the present invention to keep one or more copies of a register value available. The integrated circuit designer can now select which bus or busses will be used for a read access to the register and which bus or busses will be used for a write access to the register. In addition, the present invention can be made transparent to the software programs which run on the data processing system. As a result, the present invention allows the integrated circuit designer to save time and semiconductor area without increasing the programming complexity for a user of the data processing system.

While the present invention has been illustrated and described with reference to specific embodiments, further modifications and improvements will occur to those skilled in the art. For example, in alternate embodiments of the present invention, any type of architecture for data processing system 10 may be used. The architecture illustrated in FIG. 2 is just one possible architecture that may be used. Likewise, alternate structures may be used for the portion of MMU 54 and MMU 62 illustrated in FIG. 5.

The present invention can be used for one or more registers in a data processing systems. And, the present invention can be extended to "N" multiple register copies. The register select logic 70 can be modified so that it is able to select one or more of the original register and the "N" register copies.

It is to be understood, therefore, that this invention is not limited to the particular forms illustrated and that it is intended in the appended claims to cover all modifications that do not depart from the spirit and scope of this invention.

We claim:
1. A data processing system comprising:
    a register;
    a storage circuit;
    select logic for generating a first select signal and a second select signal, said select logic providing the first select signal to said register and providing the second select signal to said storage circuit, said select logic selectively asserting the first select signal, said select logic selectively asserting the second select signal, said select logic being coupled to said register and to said storage circuit; and
    a source circuit, coupled to said register and to said storage circuit, so that when a write access is made to said register, if the first select signal is asserted said source circuit transfers a value into said register, if the second select signal is asserted said source circuit transfers the value into said storage circuit, and if both the first and second select signals are asserted said source circuit transfers the value into both said storage circuit and said register.

2. A data processing system as in claim 1 further comprising:
    a plurality of conductors, coupled to said register and to said storage circuit;
    wherein if the value has been transferred into said storage circuit and a read access to said register is requested, said plurality of conductors transfers the value from said storage circuit to said register.

3. A data processing system as in claim 1 wherein said register and said source circuit are located on a same integrated circuit, and wherein said register is located remotely from said source circuit.

4. A data processing system as in claim 1 wherein said storage circuit can also be used to store information which is unrelated to said register.

5. A data processing system as in claim 1 wherein said storage circuit is located within a memory.

6. A data processing system as in claim 1 wherein said select logic comprises:
    a flag circuit, having a first flag value if a most recent write access to said register asserted only the first select signal, and having a second flag value if the most recent write access to said register asserted only the second select signal.

7. A data processing system as in claim 1 wherein said select logic comprises:
    write flag logic having a write flag value, the write flag value being a first write flag value if only the first select signal is to be asserted, the write flag value being a second write flag value if only the second select signal is to be asserted, and the write flag value being a third write flag value if both the first and second select signals are to be asserted.

8. A data processing system as in claim 7 wherein said select logic further comprises:
    read flag logic having a read flag value which is a first read flag value if said register is to be selected, and which is a second read flag value if said storage circuit is to be selected.

9. A data processing system as in claim 8 wherein the read flag value is the first read flag value when a most recent write access to said register caused the first select signal to be asserted.

10. A data processing system comprising:
- a plurality of registers;
- a first bus, coupled to said plurality of registers, said bus being capable of accessing only one of said plurality of registers at a specified time;
- a storage circuit;
- a second bus coupled to said storage circuit;
- a first source logic coupled to said plurality of registers, said first source logic transferring, at the specified time, a first value across said first bus into a first one of said plurality of registers;
- a second source logic, coupled to said storage circuit, said second source logic transferring, at the specified time, a second value across said second bus into said storage circuit instead of into a second one of said plurality of registers; and
- select logic, coupled to said storage circuit and to the second register, said select logic selecting the second register when a first access is made to the second register, said select logic selecting said storage circuit when a second access is made to the second register, and said select logic selecting both the second register and said storage circuit when a third access is made to the second register.

11. A data processing system as in claim 10 wherein the second register is located in close proximity to the first register, and wherein the second register is located more remotely from said second source logic.

12. A data processing system as in claim 10 wherein said storage circuit can be used for at least one purpose unrelated to the second register.

13. A data processing system as in claim 12 wherein said storage circuit is located within a memory.

14. A data processing system as in claim 10 wherein said select logic comprises:
- read flag logic for determining which one of said storage circuit and the second register is to be selected during read accesses.

15. A data processing system as in claim 14 wherein said select logic further comprises:
- write flag logic for determining if only said storage circuit is to be selected, for determining if only the second register is to be selected, and for determining if both said storage circuit and the second register are to be selected during write accesses.

16. A method for writing a register value associated with a specific register as part of execution of an instruction in a data processing system, the method comprising the steps of:
- (A) receiving the instruction;
- (B) decoding the instruction;
- (C) determining if a write operation using the register value is required;
- (D) determining which state of a plurality of states the data processing system is presently in;
- (E) if the write operation using the register value is required and the data processing system is in a first one of the plurality of states, performing the steps of:
  - (i) writing the register value into the specified register; and
  - (ii) writing the register value into a storage circuit; and
- (F) if the write operation using the register value is required and the data processing system is in a second one of the plurality of states, performing the step of:
  - (i) writing the register value into the specified register and not into the storage circuit.

17. A method as in claim 16 further comprising the step of:
- (G) if the write operation using the register value is required and the data processing system is in a third one of the plurality of states, performing the step of:
  - (i) writing the register value into the storage circuit and not into the specified register.

18. A method as in claim 16 further comprising the step of:
- (H) using at least one status bit and at least one control signal to indicate which state of the plurality of states the data processing system is presently in.

19. A method as in claim 16 wherein said step (F) further comprises the step of:
- (ii) storing, in the storage circuit, a value which is different from the register value.

20. A method as in claim 19 wherein the storage circuit is part of a memory.

* * * * *